O. B. FULLER.
Machines for Sheeting Dough.

No. 144,666.  Patented Nov. 18, 1873.

Witnesses
Thos. S. Crane.
Wm. R. Sands.

Inventor
Oakley B Fuller

UNITED STATES PATENT OFFICE.

OAKLEY B. FULLER, OF NEWARK, NEW JERSEY.

IMPROVEMENT IN MACHINES FOR SHEETING DOUGH.

Specification forming part of Letters Patent No. 144,666, dated November 18, 1873; application filed September 13, 1873.

*To all whom it may concern:*

Be it known that I, OAKLEY B. FULLER, of Newark, Essex county, New Jersey, have invented an Improvement in Machines for Sheeting Dough, of which the following is a full and complete description, reference being had to the accompanying drawing, of which—

Figure 1:
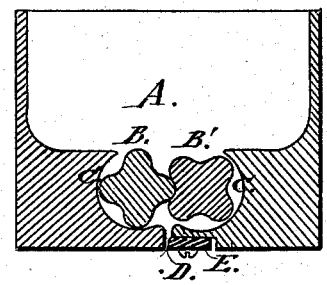
Figure 3:
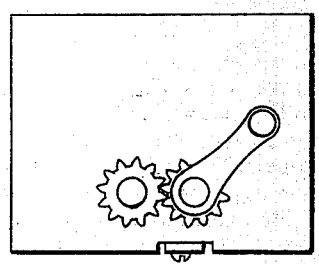
Figure 2:
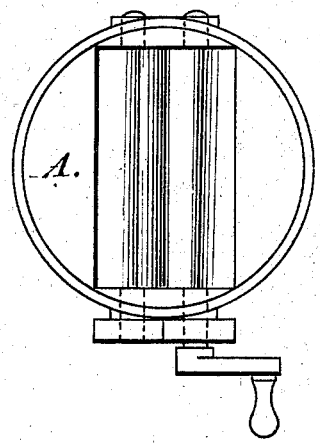
Figure 4:
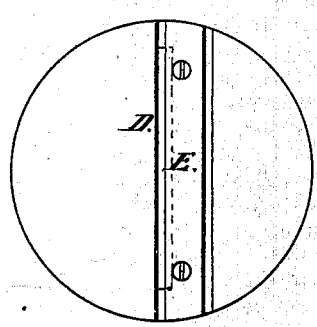

Figure 1 is a vertical section, Fig. 2 a plan, and Fig. 3 a side elevation. Fig. 4 is a view of the bottom of the machine, showing the aperture D and the adjustable jaw E.

This machine is designed to force dough in a continuous web or sheet from an aperture in a reservoir, A, and is an improvement upon a similar machine patented by me July 8, 1873.

In the bottom of the reservoir A I place two corrugated rollers, B B′, arranged between curved cheeks C, over the aperture D, in the bottom of the reservoir. These rollers are rotated by hand or steam power, and are connected at one end by a pair of gears of equal size, if the rollers have an equal number of corrugations, as shown.

It will be evident that, when the rollers are revolved, each tooth or corrugation will carry a portion of dough downward past the surfaces of the curved cheeks C, and that the revolution of the teeth in the rollers against one another will expel the dough from the corrugations, when it will have no outlet except through the aperture D.

To regulate the thickness of the sheet, I employ the adjustable jaw E, which governs the opening of the aperture or throat D.

It is evident that the corrugated rollers B B′ may be made with any number of grooves, from two upward, the expulsion of the dough from the teeth being the principal point in the construction of the machine. I have made rollers with two teeth carry the dough past the curved cheeks C C and expel it with great force from the throat D.

Having thus explained the nature of my invention, I claim, and desire to secure by Letters Patent, the following:

1. The combination of corrugated rollers and curved cheeks, in a machine for forcing dough, arranged and operated substantially as described.

2. The combination of corrugated rollers and curved cheeks, with a throat for forming a sheet of dough, whether the throat or aperture be adjustable or not.

OAKLEY B. FULLER.

Witnesses:
THOS. S. CRANE,
WM. R. SANDS.